United States Patent [19]

Jezierski

[11] Patent Number: 4,582,171

[45] Date of Patent: Apr. 15, 1986

[54] SPECIAL EFFECTS DRIVE MECHANISM FOR SELF-PROPELLED TOY VEHICLES

[75] Inventor: Dennis Jezierski, Coon Rapids, Minn.

[73] Assignee: Kusan, Inc., Brentwood, Tenn.

[21] Appl. No.: 578,363

[22] Filed: Feb. 8, 1984

[51] Int. Cl.⁴ .................... F03G 1/08; A63H 29/04; A63H 31/00

[52] U.S. Cl. .................... 185/39; 74/354; 74/810; 185/DIG. 1; 446/463; 446/464

[58] Field of Search .................... 185/37, 39, DIG. 1; 74/354, 810; 446/461, 463, 464

[56] References Cited

U.S. PATENT DOCUMENTS

| | | | |
|---|---|---|---|
| 2,257,064 | 9/1941 | Muller | 46/206 |
| 2,697,305 | 12/1954 | Muller | 46/206 |
| 3,538,640 | 11/1970 | Hayes et al. | 46/243 |
| 3,647,025 | 3/1972 | Rico | 185/39 |
| 3,798,831 | 3/1974 | Higashi | 446/464 |
| 3,995,718 | 12/1976 | Nakamori | 185/39 |
| 4,059,918 | 11/1977 | Matsushiro | 46/209 |
| 4,116,084 | 9/1978 | Masuda | 74/384 X |
| 4,278,149 | 7/1981 | Gittler | 185/39 |
| 4,363,185 | 12/1982 | Masubuchi | 74/384 X |
| 4,475,618 | 10/1984 | Kennedy et al. | 446/463 X |
| 4,478,313 | 10/1984 | Wakase | 185/39 |

FOREIGN PATENT DOCUMENTS 922214  1/1947  France .................... 446/464

Primary Examiner—Allan D. Herrmann
Attorney, Agent, or Firm—Dorsey & Whitney

[57] ABSTRACT

A unique drive mechanism for a toy vehicle is disclosed which can be selectively enabled to cause the toy to come to an abrupt halt after a powered run, and which can cause the toy to realistically imitate a "spin out" of a full scale vehicle. The drive train includes a first gear directly rotated by a coiled spring, a second gear coupled in driving engagement with the vehicle's wheels, and a third gear shiftable between an engaged position coupling the first and second gears, and a cleared position wherein the second gear can rotate independently of the first gear. The third gear can be locked in its engaged position by a pivotal, gravity biased locking mechanism. The selective, locked engagement of the first, second and third gears causes the vehicle to come to an abrupt halt after the coil spring has fully unwound at the completion of a powered run.

4 Claims, 7 Drawing Figures

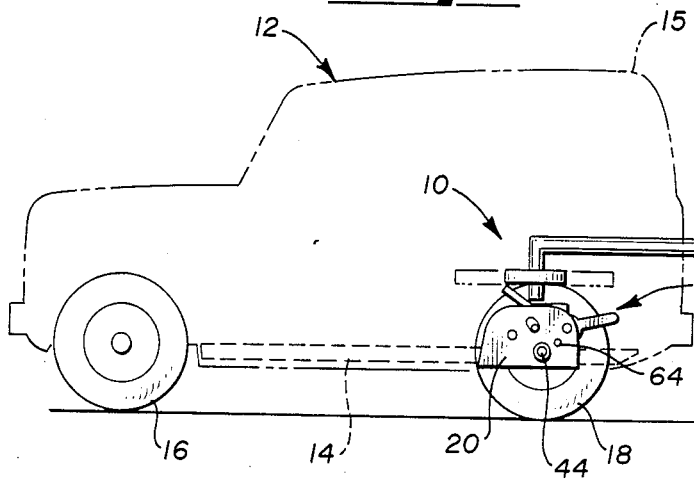
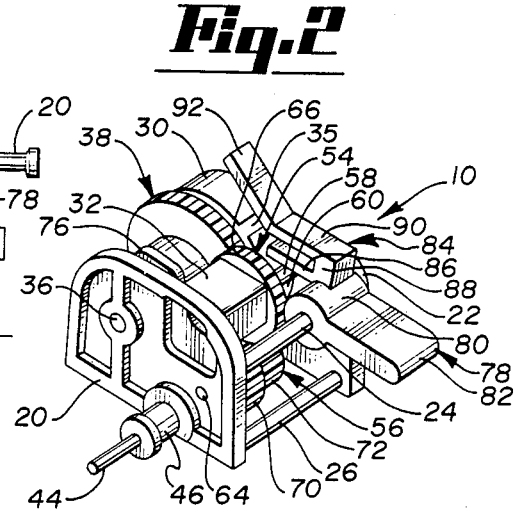
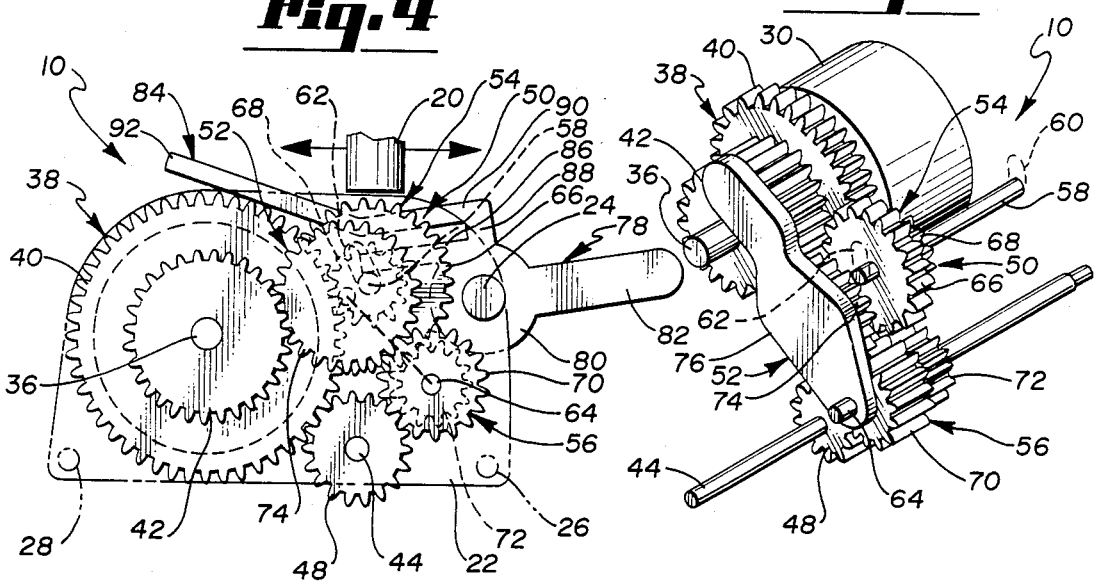

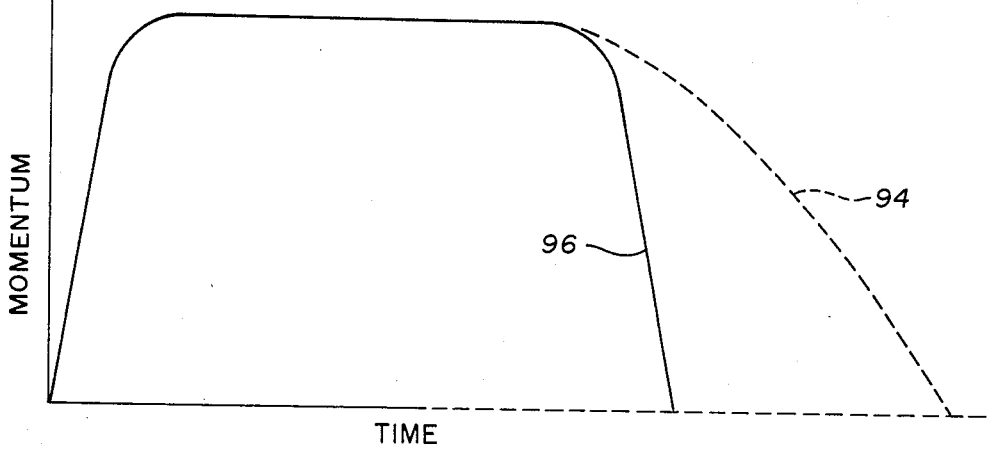
Fig. 6
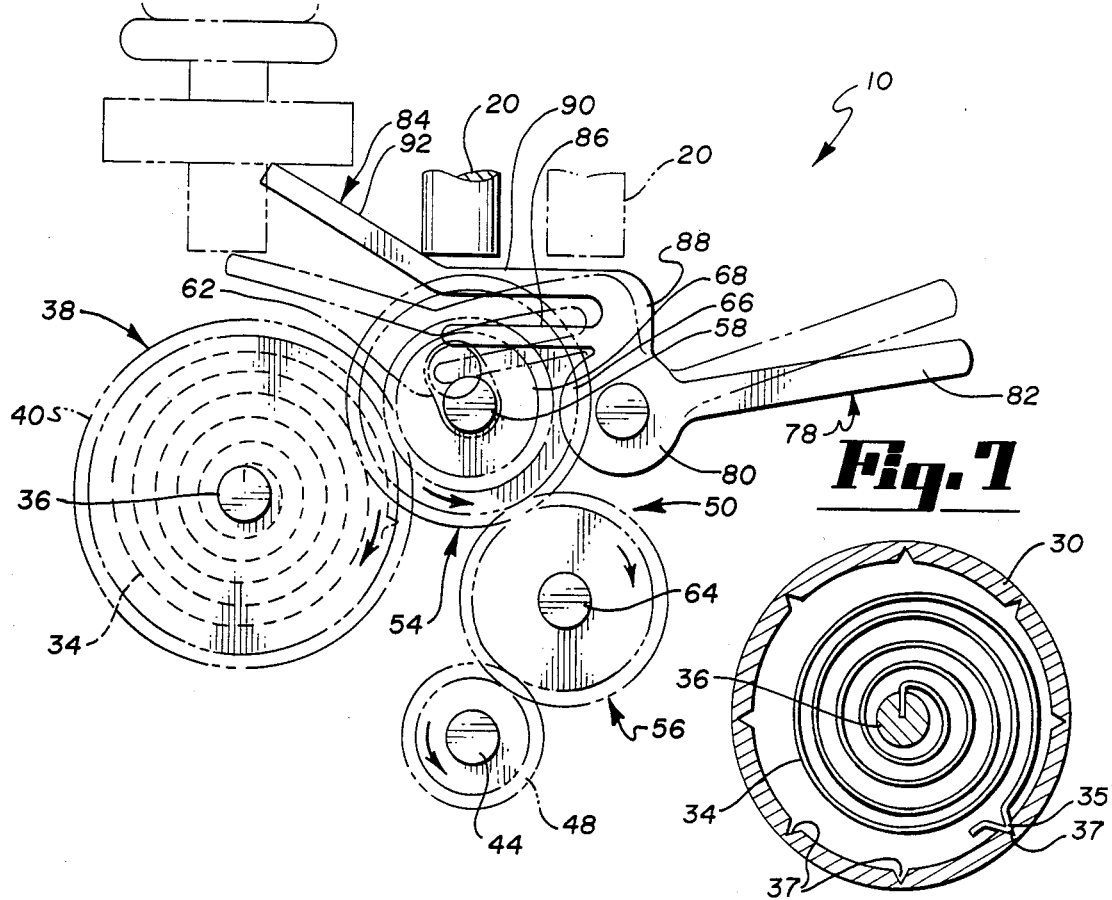

SPECIAL EFFECTS DRIVE MECHANISM FOR SELF-PROPELLED TOY VEHICLES

TECHNICAL FIELD

This invention relates to self-propelled, toy vehicles. In particular, it relates to a special effects mechanism for a motor-driven toy vehicle which is selectively enabled to cause the toy to come to an abrupt halt after a powered run, and which can cause the toy to realistically imitate the "spin out" of a full scale vehicle.

BACKGROUND ART

Self-propelled toy vehicles are well-known. The prime mover of such vehicles generally comprises an electric driven motor, an inertia driven fly wheel, or a coil spring actuated drive gear. The prime mover is typically coupled to the wheels of the toy by a geared drive train.

The play value of such toy vehicles is often directly related to their ability to realistically imitate the driving characteristics of full scale automobiles. For instance, U.S. Pat. No. 4,059,918 discloses a toy vehicle, driven by the inertia of the rotation of a fly wheel, wherein the directional movement of the vehicle may be changed from forward to neutral or to reverse while the fly wheel is rotating. U.S. Pat. No. 4,363,185 discloses a toy vehicle, also driven by an inertia driven fly wheel, having a gear changing mechanism for selectively choosing between a variety of speeds at which the vehicle can be operated. Other patents disclosing self-propelled toy vehicles are U.S. Pat. Nos. 2,257,064, 2,697,305, 3,538,640, 3,647,025, 3,995,718, 4,116,084 and 4,278,149. Heretofore, however, there have been no toy vehicles that could selectively be made to come to an abrupt halt after a powered run, or which could realistically imitate the "spin out" of a full scale automobile.

SUMMARY OF THE INVENTION

The present invention is a self-propelled toy vehicle that can perform the above described functions. That is to say, the toy vehicle hereof includes a special effects drive mechanism that can be selectively engaged to cause the toy to come to an abrupt halt after a powered run, and which can cause the toy to imitate the "spin out" of a full scale automobile.

The toy vehicle hereof broadly includes a coiled spring prime mover, a set of ground engaging wheels, and a simple yet unique drive train that enables the vehicle to selectively come to an abrupt halt before the momentum of the vehicle is fully, gradually dissipated due to frictional resistance. Moreover, the toy vehicle can be made to "spin out" at the completion of a powered run. The drive train includes a first gear directly rotated by a coiled spring, a second gear operably coupled with the vehicle's wheels in driving engagement therewith, and a third gear shiftable between an engaged position operably coupling the first and second gears, and a cleared position wherein the second gear can rotate freely of the first gear. A pivotal, gravity biased locking mechanism is provided that can be selectively engaged with the third gear for locking the third gear in its engaged position.

DESCRIPTION OF THE DRAWINGS

FIG. 1 is a basically schematic view of a special effects drive mechanism in accordance with the present invention, mounted in a toy vehicle (depicted in phantom lines);

FIG. 2 is a perspective view of the special effects drive mechanism in accordanace with the present invention;

FIG. 3 is a perspective view of the special effects drive mechanism in accordance with the present invention, with parts removed for clarity;

FIG. 4 is a sectional view of the special effects drive mechanism;

FIG. 5 is a schematic diagram of the special effects drive mechanism, arrows depicting the rotational direction of travel of the gears when the drive train is operated in the forward direction;

FIG. 6 is a graphic illustration of the operating cycle momemtum of a toy vehicle incorporating a special effects mechanism in accordance with the present invention; and FIG. 7 is a sectional view of the spring and spring shroud of the special effects mechanism.

DETAIL DESCRIPTION OF THE DRAWINGS

Referring to the drawings, a special effects drive mechanism 10 in accordance with the present invention is depicted in FIG. 1 in conjunction with a toy vehicle 12. The toy vehicle 12 includes a chassis 14 and body 15, and front and rear ground engaging wheels 16, 18. Lever 20 extends beyond the periphery of toy vehicle 12.

The drive mechanism 10 includes side walls 20, 22 held in spaced relationship by support rods 24, 26, 28. A circular in cross section main spring shroud 30 is integral with and extends inwardly from side wall 22. Support arm 32 is integral with and extends inwardly from side wall 20.

A coil spring 34 is retained within shroud 30, and is coupled in driving engagement with gear supporting shaft 36. The outermost end of spring 34 includes bent portion 35 that is slideably retained by slots 37 in shroud 30. The innermost end of spring 34 is fixedly retained by shaft 36. Shaft 36 is rotatably received within and supported by side walls 20, 22.

Compound gear 38 is carried in driving engagement by shaft 36. Compound gear 38 is comprised of first and second, concentrically mounted subgears 40, 42. Shaft 36, and gears 40, 42 are preferably integrally formed. Gear 40 is of larger diameter, and includes a greater number of gear teeth, than gear 42.

Rear wheel supporting axle 44 is carried by side walls 20, 22, and held in position by a pair of opposed retainers 46. (One of the two retainers not shown.) Axle gear 48 is carried by axle 44 in driving engagement therewith.

Gear 40 and rear axle gear 48 may be selectively interconnected by either primary gear path 50, or secondary gear path 52. Referring to FIG. 4, it should be realized that although drive gear 40 and axle gear 44 appear to be directly interconnected, the gears 40, 48 are laterally offset, and not directly connected. Primary gear path 50 comprises compound gears 54, 56. Compound gear 54 is carried by gear shaft 58. Gear shaft 58 is floatingly carried within slot 60 in side wall 22, and slot 62 in support 32. Compound gear 56 is carried by gear shaft 64. Gear shaft 64 is rotatably supported by side walls 20, 22 such that compound gear 56 is continuously engaged with axle gear 48. Rotation of compound gear 56 is thereby sympathetic with movement of the vehicle 12 along the ground or other supporting medium.

Compound gear 54 includes integrally molded, concentric gears 66, 68. Gear 66 is of larger diameter, and includes a greater number of gear teeth than gear 68. Compound gear 56 includes integrally molded, concentric gears 70, 72. Gear 70 is of larger diameter and includes more gear teeth than gear 72.

The gear meshing order of the primary gear path 50 connecting the gear 40 with axle gear 48 will now be described. Gear 40 meshes with gear 68. Gear 68 is integral with gear 66, and gear 66 meshes with gear 72. Gear 72 is integral with gear 70, and gear 70 meshes with axle gear 48. Referring in particular to FIG. 5, it will thus be seen that when gear 40 is rotated in a clockwise direction, gear 48 will be rotated in a counterclockwise direction so as to power ground engaging wheels 18 of vehicle 12 in a forward direction.

Secondary gear path 52 comprises the beforementioned compound gear 56, and gear 74 rotatably mounted on pivot arm 76. Arm 76 is pivotally mounted on gear shaft 64. Gear 74 directly, selectively, couples gear 42 with gear 70 of compound gear 56.

Locking mechanism 78 is pivotally carried by support rod 24. Locking mechanism 78 includes tubular base portion 80, gravity biased actuating arm 82, angled actuating arm 84, and shaft engaging arm 86. The actuating arm 84 and shaft engaging arm 86 are integrally coupled to the tubular base 80 by radially extending stub portion 88. Angled actuating arm 84 includes inner arm portion 90 and outer arm portion 92. Arm portion 90 is oriented generally parallel with shaft engaging arm 86. The entire locking portion 78 preferably comprises an integrally molded piece. Each of the above described components, with the exception of metal axle 44 and coil spring 34, are preferably formed from a synthetic resin material.

The relative orientation of gear shafts 36, 58, and 64, as best depicted in FIG. 5, is such that rotation of gear 40 in a clockwise direction, under the influence of spring 34, applies torque to compound gear 54 so as to urge compound gear 54 into driving engagement with gear 56. Primary gear path 50, therefore, provides an energy transmission path from the uncoiling spring 34 to the ground engaging wheels 18 so as to power the vehicle 12 in a forward direction.

As described above, the gear shaft 58 which supports compound gear 54 is carried by slot 60 in side wall 22, and slot 62 in support arm 32. In the absence of applied torque from gear 40, therefore, shaft 58 and attached compound gear 54 ar free to float upwardly within the bounds of slots 60, 62. In this regard, it will be noted that the orientation of gear shaft 58 relative to gear shaft 64 is such that compound gear 54 and gear shaft 58 will be urged upwardly by the clockwise rotation of gear 56 in the absence of torque applied to compound gear 54 by the gear 40. It will thus be appreciated that once the energy stored within coil spring 34 is fully released, and converted into forward momentum of the vehicle 12, compound gear 54 will be shifted upwardly, out of engagement with gear 40, due to the continued rotation of compound gear 56 as the forward momentum of the vehicle 12 is gradually dissipated due to wheel friction and air resistance. In this manner, gear 40 is disengaged from the drive train of vehicle 12 once the energy within coil spring 34 is released, and the vehicle 12 can continue its forward motion without experiencing drag from gear 40 or the coil spring 34.

Locking mechanism 78 permits the operator of toy vehicle 12 to selectively lock gear shaft 58 into its lower, engaged position. Locking mechanism 78 is normally pivoted out of engagement with gear shaft 58 by gravity actuated biasing arm 82. Shifting of lever 20 to its locking position adjacent portion 92 of actuating arm 84, however, urges shaft engaging arm 86 into touching engagement with gear shaft 58. Gear shaft 58 is thereby retained in its lower position, and is no longer free to ride up within slots 60, 62. Gear 40 and coil spring 36, therefore, will be continuously engaged in the drive train of vehicle 12, even when the energy stored within coiled spring 34 is fully expended. Gear 40 and coiled spring 34 present a significant drag on the forward motion of vehicle 12, and will cause the vehicle 12 to come to an abrupt halt once the energy stored within coiled spring 34 is fully expanded. In this regard, it will be appreciated that the detainment of the outermost, bent portion 35 of spring 34 within a slot 37, and the detainment of the innermost spring end of axle 36, prevents rotation of the axle 36 (and gear 38), when the spring is uncoiled. The spring portion 35, however, can slip from the notch 37 when undue force is applied to the uncoiled spring, to prevent damage to the mechanism.

Referring to FIG. 6, the difference in the momentum dissipation rates of the vehicle 12 due to the engagement and disengagement of locking mechanism 78 is graphically illustrated. The vehicle's momentum rapidly increases and comes to a relatively stable level as energy from the coil spring 34 is transferred to ground engaging wheels 18. When locking mechanism 78 is disengaged, the momentum of the vehicle is allowed to gradually dissipate as indicated by the dashed line 94. With the locking mechanism 88 engaged, however, momentum of the vehicle is rapidly dissipated as indicated by the solid line 96.

Engagement of the locking mechanism 78 causes toy vehicle 12 to imitate an abrupt, braked stop of an actual vehicle. As an additional feature, the abrupt stopping of the vehicle 12 can lead to a "spin out" of the vehicle, if the mass of the vehicle 12 is appropriately distributed. That is to say, the vehicle 12 will imitate the spin out of an actual vehicle if the vehicle's center of gravity is located rearward of a point midway between the front and rear ground engaging wheels 16, 18.

Secondary gear path 52 provides a means for winding coil spring 38 by pushing vehicle 12 rearwardly. That is to say, the counterclockwise rotation of gear 56 (as depicted in the figures) effected by rearward travel of vehicle 12 urges gear 74 into driving engagement with gear 42, while at the same time, compound gear 54 is lifted out of engagement with compound gear 56 by the counterclockwise rotation of gear 40. The clockwise rotation of compound gear 56 associated with forward movement of the vehicle 12 lifts the gear 74 out of engagement with gear 42 so that gear 74 will not interfere with the forward operation of vehicle.

I claim:

1. A special effects drive mechanism for propelling a toy vehicle, or the like, along a path of travel over a supporting medium, comprising:
   means comprising a coiled spring for storing a quantity of energy;
   a first circular toothed gear operably coupled to said storage means for rotational movement of said first gear by said storage means when said quantity of energy is released;

a second circular toothed gear spaced from said first gear and operably coupled with said medium for rotational movement of said second gear sympathetic with movement of said vehicle along said path of travel;

a third circular toothed gear shiftable between an engagement position wherein said first and second gears are operably coupled by said third gear, and a second position wherein said third gear clears engagement of said first and second gears such that said second gear may move independently of said first gear;

said third gear being oriented relative to said first and second gears such that rotation of said first gear under the influence of said energy storage means urges said third gear into said engagement position and rotation of said second gear in the absence of rotation of said first gear by said energy means urges said third gear into said disengagement position; and means for selectively locking said third gear in said engagement position whereby movement of said second gear may be abruptly stopped by said coupling of said first and second gears when said storage means has fully released said quantity of energy.

2. An assembly as claimed in claim 1, said locking means including a locking member shiftable between a locking position wherein said locking member operably engages said third gear and a release position wherein said locking member clears said third gear.

3. An assembly as claimed in claim 2, said locking means including a hand graspable lever operably coupled with said member for shifting said member between said locking and release positions.

4. An assembly as claimed in claim 3, said locking means comprising a pivotal base and gravity actuated biasing arm, said locking member and said arm each projecting outwardly from said base, said arm oriented relative to said locking member such that said locking member is urged clear of operable engagement with said third gear by the weight of said biasing arm, and said locking member being operably engageable by said lever for shifting of said locking member into operable engagement with said third gear against the urging of said biasing arm.

* * * * *